United States Patent
Choi et al.

(10) Patent No.: US 8,217,948 B2
(45) Date of Patent: Jul. 10, 2012

(54) DISPLAY INTERFACE SYSTEM, DISPLAY DEVICE AND DISPLAY SYSTEM

(75) Inventors: Dong-Chul Choi, Seoul (KR); Nam-Hyun Kim, Yongin-si (KR); Han-Kyul Lim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 611 days.

(21) Appl. No.: 12/416,737

(22) Filed: Apr. 1, 2009

(65) Prior Publication Data
US 2009/0251479 A1 Oct. 8, 2009

(30) Foreign Application Priority Data
Apr. 8, 2008 (KR) .................. 10-2008-0032612

(51) Int. Cl.
*G06T 13/00* (2011.01)
(52) U.S. Cl. .......................... 345/473; 345/211
(58) Field of Classification Search .............. 345/473, 345/211
See application file for complete search history.

(56) References Cited

U.S. PATENT DOCUMENTS
| | | | | |
|---|---|---|---|---|
| 5,999,693 A | * | 12/1999 | Juri et al. | 386/326 |
| 2004/0264375 A1 | * | 12/2004 | Kim | 370/232 |
| 2005/0068288 A1 | * | 3/2005 | Jang et al. | 345/100 |

FOREIGN PATENT DOCUMENTS
| | | | |
|---|---|---|---|
| JP | 2007240741 A | * | 9/2007 |
| KR | 1020050063567 | | 6/2005 |
| KR | 1020070057504 | | 6/2007 |

OTHER PUBLICATIONS
English Abstract for Publication No. 1020050063567, Jun. 2005.
English Abstract for Publication No. 1020070057504, Jun. 2007.

* cited by examiner

*Primary Examiner* — Maurice L McDowell, Jr.
(74) *Attorney, Agent, or Firm* — F. Chau & Associates, LLC

(57) ABSTRACT

A display interface system includes a display transmitter and a display receiver. The display transmitter transmits a control pattern having image type information about a type of an image to be displayed and selectively transmits image data according to the type of the image to be displayed. The display receiver receives the control pattern and selectively receives the image data based upon the image type information, reducing power consumption.

14 Claims, 6 Drawing Sheets

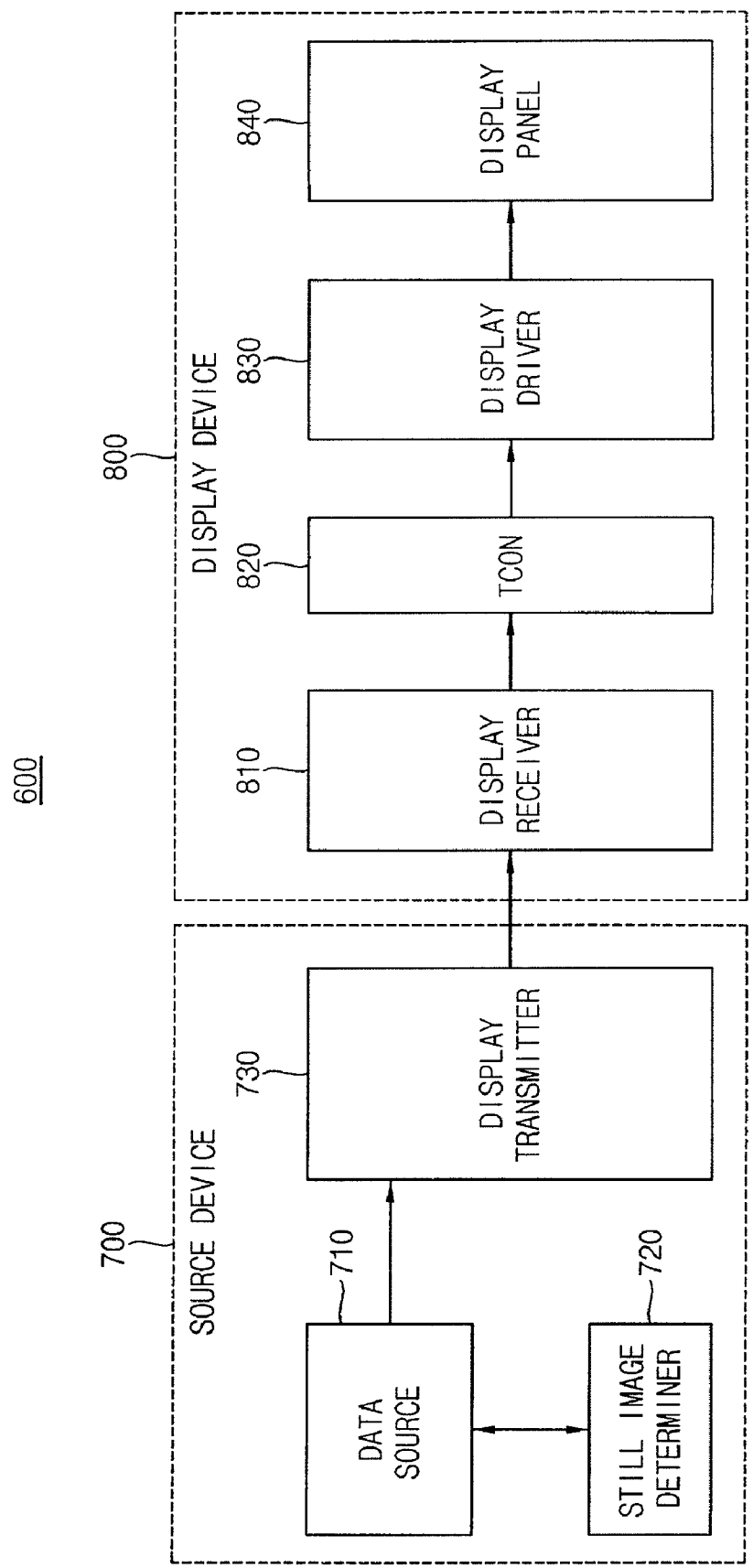

DISPLAY INTERFACE SYSTEM, DISPLAY DEVICE AND DISPLAY SYSTEM

CROSS-REFERENCE TO RELATED APPLICATION

This application claims priority to and the benefit of Korean Patent Application No. 10-2008-0032612, filed on Apr. 8, 2008 in the Korean Intellectual Property Office (KIPO), the entire contents of which are incorporated herein by reference.

BACKGROUND

1. Technical Field

The present disclosure relates to a display interface, and, more particularly, to a display interface system, a display device and a display system capable of reducing power consumption.

2. Discussion of the Related Art

A display system includes a source device for providing image data and a display device for displaying the provided image data. For example, the source device may include a digital versatile disc (DVD) player, a computer, a set top box (STB), a video game console, a digital camcorder, a processor of a mobile phone, or the like. The display device may include a digital television (TV), a monitor, a display device of a mobile phone, or the like.

Recently, display interface techniques have been developed to transfer signals rapidly and without loss between the source device and the display device. Such a display interface may include a digital visual interface (DVI), a high definition multimedia interface (HDMI), a mobile industry processor interface (MIPI), a DisplayPort, or the like.

The DVI is a video interface standard for transferring signals between a personal computer (PC) and the monitor, which is defined by a digital display working group (DDWG). The DVI is based upon a transition minimized differential signaling (TDMS) technology. Such a DVI has been widely used in a plasma display device, a peripheral device, as well as the PC. Recently, the HDMI, which is applicable to a high resolution system based upon the DVI, has been widely adopted.

The HDMI is a digital interface that provides for both uncompressed digital image signals and uncompressed digital sound signals and allows for the transmission and reception of high resolution image and sound data. The HDMI provides an interface between the source device, such as the STB, the DVD player, or the like, and the display device, such as the monitor, the digital TV, or the like. The HDMI is compatible with the DVI. The HDMI may be based upon the TDMS that is employed in the DVI. A TDMS signal conversion includes a modulation from parallel data to high-speed serial data in a transmitter and a corresponding demodulation in a receiver.

In a conventional display system, image data is typically transferred per frame regardless of whether the frame data is for a moving image or a still image. For example, if a refresh rate of the display system is 30 Hz, the image data is transferred thirty times per second. In particular, although the frame data is for a still image, the same image data is transferred thirty times per second.

As such, in the conventional display system, the same image data is constantly transferred even though frame data for a still image is transferred, thereby increasing power consumption.

SUMMARY

An exemplary embodiment of the present invention provides a display interface system having low power consumption by transferring a control pattern having image type information.

An exemplary embodiment also provides a display device having low power consumption by receiving a control pattern having image type information.

An exemplary embodiment further provides a display system having low power consumption by transferring a control pattern having image type information.

According to an exemplary embodiment, a display interface system includes a display transmitter and a display receiver. The display transmitter transmits a control pattern having image type information about a type of an image to be displayed, and selectively transmits image data according to the type of the image to be displayed. The display receiver receives the control pattern, and selectively receives the image data based upon the image type information.

In an exemplary embodiment the display transmitter transmits the image data when the image to be displayed is a moving image and does not transmit the image data when the image to be displayed is a still image. The display receiver receives the image data when the image to be displayed is the moving image and does not receive the image data when the image to be displayed is the still image.

In an exemplary embodiment, the image type information includes a still image bit indicating whether the image to be displayed is a still image or a moving image. The image type information may further include a still image count representing a number of frames of the still image to be sequentially displayed.

In an exemplary embodiment, the display transmitter includes a first link layer unit configured to encode the control pattern and to selectively encode the image data, and a first physical layer unit configured to transmit the control pattern and to selectively transmit the image data. The display receiver includes a second physical layer unit configured to receive the control pattern and to selectively receive the image data, and a second link layer unit configured to decode the control pattern and to selectively decode the image data.

In an exemplary embodiment, the first link layer unit encodes the image data when the image to be displayed is a moving image and does not encode the image data when the image to be displayed is a still image. The first physical layer unit transmits the image data when the image to be displayed is the moving image, and does not transmit the image data when the image to be displayed is the still image. The second physical layer unit receives the image data when the image to be displayed is the moving image, and does not receive the image data when the image to be displayed is the still image. The second link layer unit decodes the image data when the image to be displayed is the moving image, and does not decode the image data when the image to be displayed is the still image.

In an exemplary embodiment, the display transmitter includes a first power supply unit for providing first power to the first link layer unit and the first physical layer unit. The display receiver includes a second power supply unit for providing second power to the second physical layer and the second link layer unit. The first power supply unit provides the first power to only a portion of the first link layer unit and only a portion of the first physical layer unit when the image to be displayed is a still image, and the second power supply unit provides the second power to only a portion of the second physical layer and only a portion of the second link layer unit when the image to be displayed is the still image.

In an exemplary embodiment, the first link layer unit includes a control pattern encoder for encoding the control pattern and an image data encoder for encoding the image data. The first physical layer unit includes a control pattern transmitting unit for transmitting the control pattern and an image data transmitting unit for transmitting the image data. The second physical layer unit includes a control pattern receiving unit for receiving the control pattern and an image data receiving unit for receiving the image data. The second link layer unit includes a control pattern decoder for decoding the control pattern and an image data decoder for decoding the image data. The first power supply unit provides the first power to the control pattern encoder and the control pattern transmitting unit and does not provide the first power to the image data encoder and the image data transmitting unit when the image to be displayed is the still image. The second power supply unit provides the second power to the control pattern receiving unit and the control pattern decoder and does not provide the second power to the image data receiving unit and the image data decoder when the image to be displayed is the still image.

According to an exemplary embodiment, a display device includes a display receiver, a timing controller, a panel driving unit and a display panel. The display receiver receives a control pattern having image type information about a type of an image to be displayed, and selectively receives image data based upon the image type information. The timing controller receives the image data from the display receiver, and stores the image data. The panel driving unit receives the image data from the timing controller, and generates driving signals corresponding to the image data. The display panel receives the driving signals from the panel driving unit, and displays the image corresponding to the image data.

In an exemplary embodiment, the display receiver receives the image data when the image to be displayed is a moving image, and does not receive the image data when the image to be displayed is a still image.

In an exemplary embodiment, the image type information includes a still image bit indicating whether the image to be displayed is a still image or a moving image. The image type information may further include a still image count representing a number of frames of the still image to be sequentially displayed.

In an exemplary embodiment, the display receiver may include a physical layer unit configured to receive the control pattern and to selectively receive the image data, and a link layer unit configured to decode the control pattern and to selectively decode the image data.

In an exemplary embodiment, the physical layer unit receives the image data when the image to be displayed is a moving image, and does not receive the image data when the image to be displayed is a still image. The link layer unit decodes the image data when the image to be displayed is the moving image, and does not decode the image data when the image to be displayed is the still image.

In an exemplary embodiment, the display receiver further includes a power supply unit for providing power to the physical layer and the link layer unit. The power supply unit provides power to only a portion of the physical layer and only a portion of the link layer unit when the image to be displayed is the still image.

In an exemplary embodiment, the timing controller includes a frame memory for storing the image data. The timing controller controls the frame memory to store the image data when the image data to be displayed is a moving image. The timing controller provides the image data stored in the frame memory to the panel driving unit when the image data to be displayed is a still image.

In an exemplary embodiment, a display system includes a source device and a display device. The source device includes a display transmitter. The display transmitter transmits a control pattern having image type information about a type of an image to be displayed, and selectively transmits image data according to the type of the image to be displayed. The display device includes a display receiver. The display receiver receives the control pattern, and selectively receives the image data based upon the image type information.

In an exemplary embodiment, the image type information includes a still image bit indicating whether the image to be displayed is a still image or a moving image. The image type information may further include a still image count representing a number of frames of the still image to be sequentially displayed.

In an exemplary embodiment, the source device further includes a data source configured to generate the control pattern and the image data, and a still image determiner configured to determine whether the image to be displayed is a still image or a moving image.

In accordance with exemplary embodiments of the present invention, power consumption of a display interface is reduced by using a control pattern having image type information and an efficient power save mode is provided.

BRIEF DESCRIPTION OF THE DRAWINGS

Illustrative, non-limiting example embodiments will be more clearly understood from the following detailed description taken in conjunction with the accompanying drawings.

FIG. 7 is a block diagram illustrating a display system according to an exemplary embodiment.

DETAILED DESCRIPTION OF THE EMBODIMENTS

It will be understood that, although the terms first, second, third etc. may be used herein to describe various elements, these elements should not be limited by these terms. These terms are used to distinguish one element from another. Thus, a first element discussed below could be termed a second element without departing from the teachings of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Figure 1:
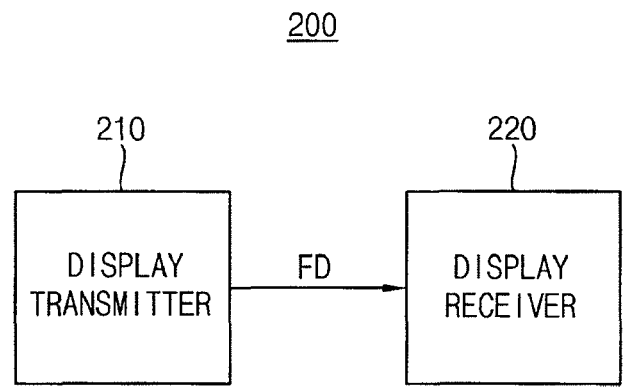
FIG. 1 is a block diagram illustrating a display interface system according an exemplary embodiment of the present invention.

FIG. 1 is a block diagram illustrating a display interface system according to an exemplary embodiment of the present invention. The display interface system 200 includes a display transmitter 210 and a display receiver 220. The display transmitter 210 transmits frame data FD to the display receiver 220 in units of frame for an image. The frame data FD may include image data that is data for pixels of the image displayed by a display panel (not shown), and/or a control pattern. The control pattern may include image type information about the type of the displayed image. The displayed image may be displayed based upon the transferred frame data FD. The image type information may include information about whether the displayed image is a moving image or a still image. The moving image may be a current image different from a previous image that is displayed based upon previously transferred frame data. The still image may be a current image identical to the previous image. In an exemplary embodiment, the control pattern may include sound data, control data, auxiliary data, error correction codes, horizontal synchronization signals (HSYNC), vertical synchronization signals (VSYNC), image information data, and sound information data.

The display transmitter 210 informs the display receiver 220 whether current frame data FD is for the moving image or for the still image by transferring the control pattern having the image type information. When the frame data FD for the moving image is transferred, the display transmitter 210 transmits the image data and the control pattern. When the frame data FD for the still image is transferred, the display transmitter 210 transmits only the control pattern. The display transmitter 210 operates in a power save mode when the frame data FD for the still image is transferred. Accordingly, power consumption is reduced when the display transmitter 210 transmits the frame data FD for the still image.

The display receiver 220 receives the frame data FD from the display transmitter 220 in units of frame for an image. The display receiver 220 provides the received frame data FD to a display panel through a timing controller as will be described with reference to FIG. 6, and thus the image corresponding to the frame data FD is displayed. When the control pattern includes sound data, the display receiver 220 provides the sound data to a sound output device (not shown), such as a speaker.

The display receiver 220 receives the control pattern having the image type information from the display transmitter 220. When the image type information indicates the currently transferred frame data FD is for the still image, the display receiver 220 receives and decodes only the control pattern. The display receiver 220 operates in the power save mode when the frame data FD for the still image is transferred. Accordingly, the power consumption is reduced when the display receiver 220 receives the frame data FD for the still image.

Figure 2:
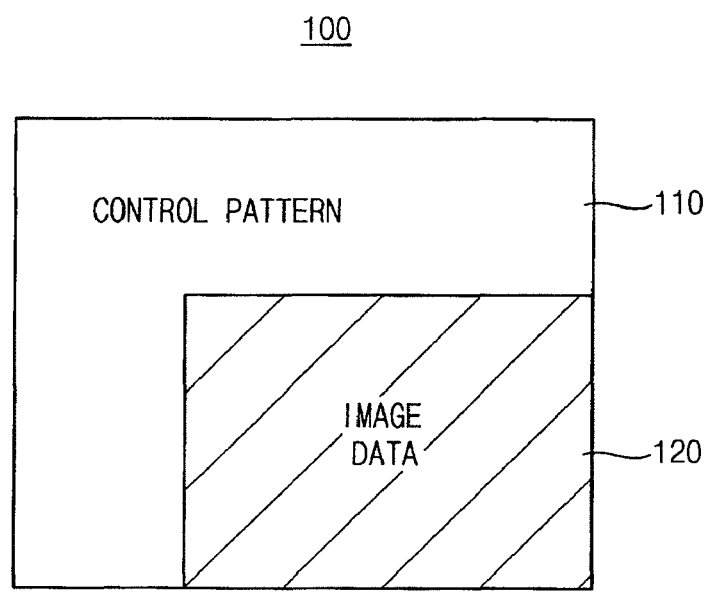
FIG. 2 is a diagram illustrating frame data for a frame of an image.

FIG. 2 is a diagram illustrating frame data for a frame of an image. The frame data 100 for one frame includes a control pattern 110 and image data 120. The image data 120 is data for all pixels of an image displayed by a display device. The display device displays the image corresponding to the one frame by using the image data 120 received from a source device. The control pattern 110 may include image type information, sound data, control data, auxiliary data, error correction codes, horizontal synchronization signals (HSYNC), vertical synchronization signals (VSYNC), image information data, and sound information data.

Figure 3:
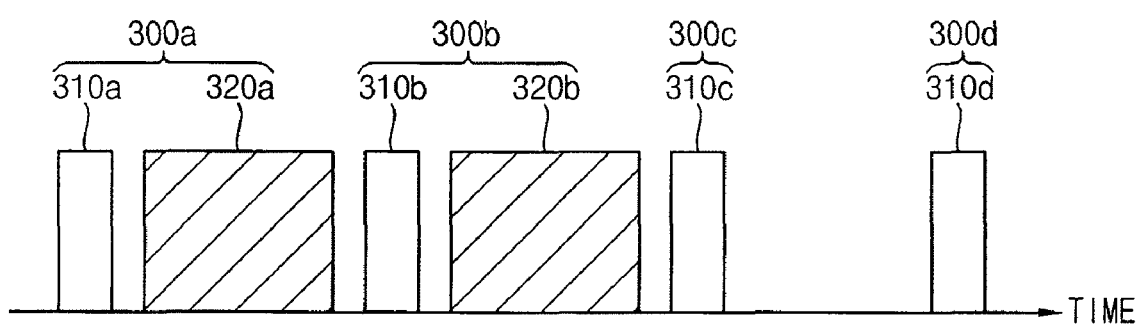
FIG. 3 is a diagram illustrating frame data transferred in the display interface system of FIG. 1.

FIG. 3 is a diagram illustrating an exemplary embodiment of frame data transferred in the display interface system of FIG. 1. First frame data 300a includes a first control pattern 310a and first image data 320a, and second frame data 300b includes a second control pattern 310b and second image data 320b. Third frame data 300c includes only a third control pattern 310c, and fourth frame data 300d includes only a fourth control pattern 310d. The third frame data 300c and the fourth frame data 300d do not include image data.

The first frame data 300a and the second frame data 300b would be frame data for moving images, and thus the first and the second frame data 300a, 300b include the first and the second control patterns 310a, 310b and the first and the second image data 320a, 320b, respectively. The second image data 320b would be different from the first image data 320a, and thus the second frame data 300b includes the second image data 320b as well as the second control pattern 310b.

The third frame data 300c and the fourth frame data 300d are frame data for still images, and thus the third and the fourth frame data 300c, 300d include only the third and the fourth control patterns 310c, 310d, respectively. Since an image to be displayed based upon the third frame data 300c is the same as an image corresponding to the second image data 320b, the third frame data 300c does not include the image data. The display receiver 220 illustrated in FIG. 1 receives and decodes the third control pattern 310c having image type information, and an image is displayed based upon stored image data in a display device. Since an image to be displayed based upon the fourth frame data 300c is the same as the image to be displayed based upon the third frame data 300c, or the image corresponding to the second image data 320b, the fourth frame data 300d does not include the image data. The image based upon the fourth frame data 300c is displayed based upon the stored image data.

Figure 4:
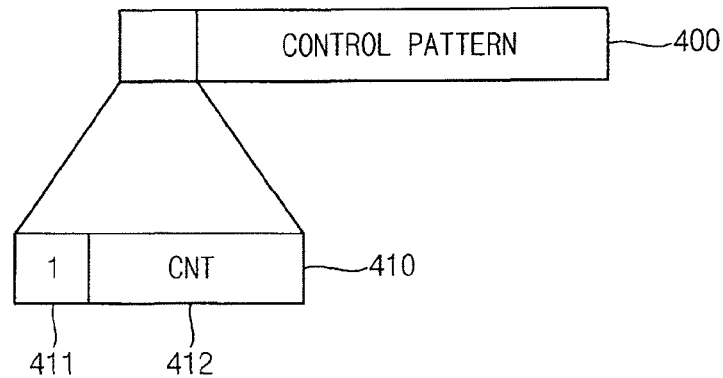
FIG. 4 is a diagram illustrating a control pattern having image type information.

FIG. 4 is a diagram illustrating a control pattern having image type information. The control pattern 400 includes the image type information 410. In an exemplary embodiment, the control pattern 400 may include sound data, control data, auxiliary data, error correction codes, HSYNC, VSYNC, image information data, sound information data, or the like.

The image type information 410 includes a still image bit 411. The still image bit 411 indicates whether currently transferred frame data is for a moving image or for a still image. For example, if the still image bit 411 has a value of one, the frame data is for the still image. If the still image bit 411 has a value of zero, the frame data is for the moving image.

In an exemplary embodiment, the image type information 410 further includes a still image count 412. The still image count 412 represents the number of frame data for still images to be subsequently transferred. In an exemplary embodiment, the number of frame data for still images may be counted including the currently transferred frame data or excluding the currently transferred frame data. The still image count 412 may include one or more bits. In an exemplary embodiment, the image type information 410 may have a packet structure. The image type information 410 may further include a packet header for representing the image type information 410.

Referring again to FIG. 1, when the frame data FD for a still image is transferred, the display transmitter 210 transmits only the control pattern 400 having the image type information 410 illustrated in FIG. 4, and the display receiver 220 receives only the control pattern 400 having the image type information 410 illustrated in FIG. 4. Therefore, when the frame data FD for the still image is transferred, power consumption in the display interface system 200 is reduced.

Figure 5A:
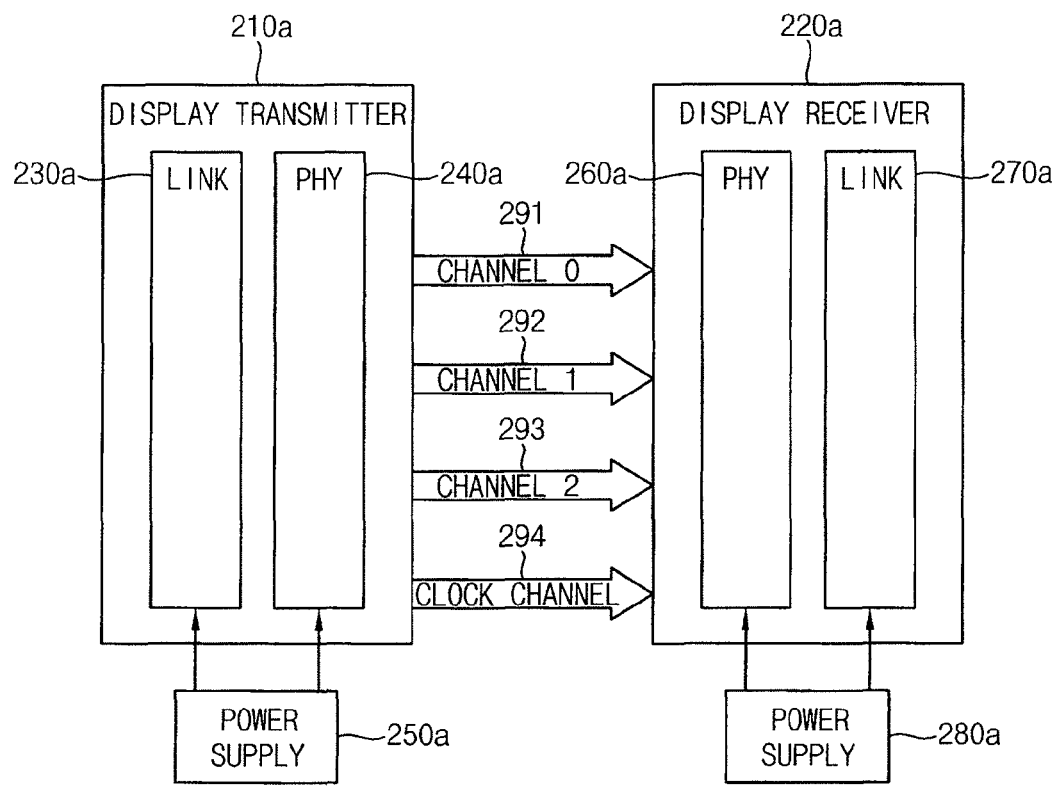
FIG. 5A is a block diagram illustrating a display interface system according to an exemplary embodiment.

FIG. 5A is a block diagram illustrating a display interface system according to an exemplary embodiment of the present invention. The display interface system 200a includes a display transmitter 210a, a display receiver 220a, a first power supply unit 250a and a second power supply unit 280a.

The display transmitter 210a includes a first link layer unit 230a and a first physical layer unit 240a. The first link layer unit 230a encodes image data and a control pattern provided from a data source (not shown). In an exemplary embodiment, the control pattern has a packet structure. The first physical layer unit 240a receives the encoded image data and the encoded control pattern from the first link layer unit 230a, and transmits the encoded image data and the encoded control pattern to the display receiver 220a. In an exemplary embodiment, the first physical layer unit 240a transmits the encoded image data and the encoded control pattern through data channels 291, 292, 293. When frame data for a still image is transmitted, the first link layer unit 230a encodes only the control pattern, and the first physical layer unit 240a transmits only the encoded control pattern. Accordingly, power consumption is reduced when the display transmitter 210a transmits the frame data for the still image.

The first power supply unit 250a provides power to the first link layer unit 230a and the first physical layer unit 240a included in the display transmitter 210a. In an exemplary embodiment, the first power supply unit 250a may be included in the display transmitter 210a. When the frame data for the still image is transmitted, the first power supply unit 250a provides power to a portion of the first link layer unit 230a and to a portion of the first physical layer unit 240a. Accordingly, when the frame data for the still image is transmitted, the power supplied from the first power supply unit 250a to the first link layer unit 230a and the first physical layer unit 240a is reduced.

The data channels 291, 292, 293 and a clock channel 294 are connected between the display transmitter 210a and the display receiver 220a. In an exemplary embodiment, the data channels 291, 292, 293 and the clock channel 294 may be formed on one cable. The display transmitter 210a transmits the image data and the control pattern through the data channels 291, 292, 293 to the display receiver 220a. The display transmitter 210a transmits a reference clock signal through the clock channel 294 to the display receiver 220a, and the display receiver 220a recovers the image data and the control pattern based upon the reference clock signal.

The display receiver 220a includes a second physical layer unit 260a and a second link layer unit 270a. The second physical layer unit 260a receives the image data and the control pattern from the first physical layer unit 240a through the data channels 291, 292, 293. The second link layer unit 270a decodes the image data and the control pattern received by the second physical layer unit 260a. When the frame data for the still image is received, the second physical layer unit 260a receives only the control pattern, and the second link layer unit 270a decodes only the control pattern. Accordingly, power consumption is reduced when the display receiver 220a receives the frame data for the still image.

The second power supply unit 280a provides power to the second physical layer unit 260a and the second link layer unit 270a included in the display receiver 220a. In an exemplary embodiment, the second power supply unit 280a may be included in the display receiver 220a. When the frame data for the still image is received, the second power supply unit 280a provides power to a portion of the second physical layer unit 260a and to a portion of the second link layer unit 270a. Accordingly, when the frame data for the still image is received, the power supplied from the second power supply unit 280a to the second physical layer unit 260a and the second link layer unit 270a is reduced.

Figure 5B:
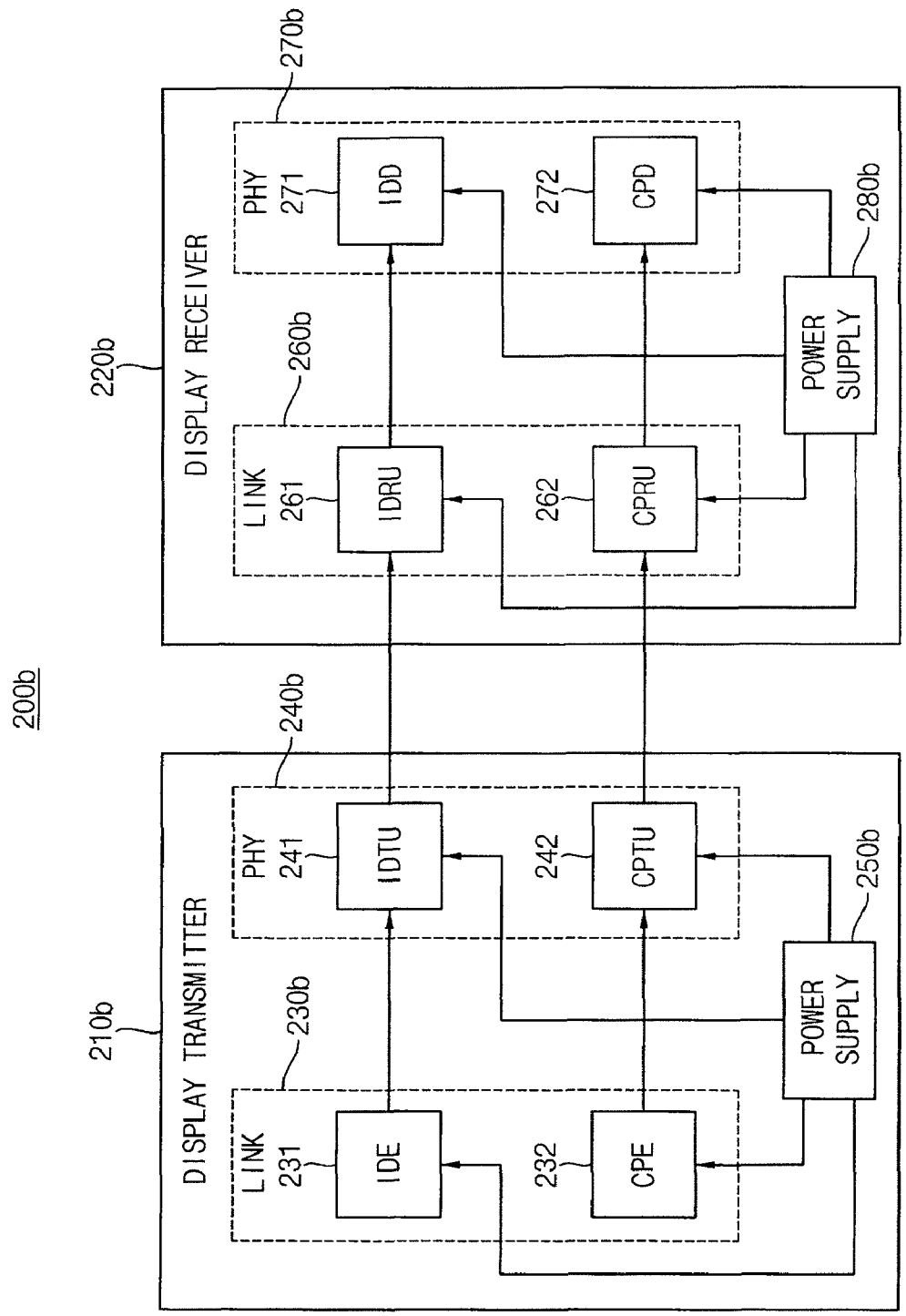
FIG. 5B is a block diagram illustrating a display interface system according to an exemplary embodiment.

FIG. 5B is a block diagram illustrating a display interface system according to an exemplary embodiment. The display interface system 200b includes a display transmitter 210b and a display receiver 220b.

The display transmitter 210b includes a first link layer unit 230b, a first physical layer unit 240b and a first power supply unit 250b. The first link layer unit 230b may encode image data and a control pattern. The first physical layer unit 240b transmits the encoded image data and the encoded control pattern to the display receiver 220b. The first power supply unit 250b provides power to the first link layer unit 230b and the first physical layer unit 240b. In an exemplary embodiment the display transmitter 210b may not include the first power supply unit 250b, and the first power supply unit 250b may be included in an external device.

The first link layer unit 230b includes an image data encoder (IDE) 231 for encoding the image data and a control pattern encoder (CPE) 232 for encoding the control pattern. In an exemplary embodiment, the IDE 231 may encode the image data into a RGB 4:4:4 format, an YCbCr 4:2:2 format, an YCbCr 4:4:4 format, or the like. In some embodiments, the CPE 232 may encode the control pattern such that the control pattern has a packet structure. The first physical layer unit 240b includes an image data transmitting unit (IDTU) 241 for transmitting the image data encoded by the IDE 231 and a control pattern transmitting unit (CPTU) 242 for transmitting the control pattern encoded by the CPE 232.

When frame data for a moving image is transmitted, the first power supply unit 250b provides power to the IDE 231, the CPE 232, the IDTU 241 and the CPTU 242. The IDE 231, the CPE 232, the IDTU 241 and the CPTU 242 encodes and transmits the image data and the control pattern.

When frame data for a still image is transmitted, the IDE 231 and the IDTU 241 does not operate, and only the CPE 232 and the CPTU 242 operates. Accordingly, when the frame data for the still image is transmitted, the first power supply unit 250b does not provide power to the IDE 231 and to the IDTU 241. Therefore, power consumption of the display transmitter 210b is reduced.

The display receiver 220b includes a second physical layer unit 260b, a second link layer unit 270b and a second power supply unit 280b. The second physical layer unit 260b receives the image data and the control pattern transmitted form the first physical layer unit 240b. The second link layer unit 270b decodes the image data and the control pattern received by second the physical layer unit 260b. The second power supply unit 280b provides power to the second physical layer unit 260b and to the second link layer unit 270b. In an exemplary embodiment, the display receiver 220b may not include the second power supply unit 280b, and the second power supply unit 280b may be included in an external device.

The second physical layer unit 260b includes an image data receiving unit (IDRU) 261 for receiving the image data and a control pattern receiving unit (CPRU) 262 for receiving the control pattern. The second link layer unit 270b includes an image data decoder (IDD) 271 for decoding the image data received by the IDRU 261 and a control pattern decoder (CPD) 272 for decoding the control pattern received by the CPRU 262. When the frame data for the still image is received, the IDRU 261 and the IDD 271 do not operate.

When the frame data for the moving image is received, the second power supply unit 280b provides power to the IDRU 261, the CPRU 262, the IDD 271 and the CPD 272. The IDRU 261, the CPRU 262, the IDD 271 and the CPD 272 receive and decode the image data and the control pattern.

When the frame data for the still image is received, the IDRU 261 and the IDD 271 do not operate, and only the CPRU 262 and the CPD 272 operate. Accordingly, when the frame data for the still image is received, the second power supply unit 280b does not provide power to the IDRU 261 and the IDD 271. Therefore, power consumption of the display receiver 220b is reduced.

Figure 6:
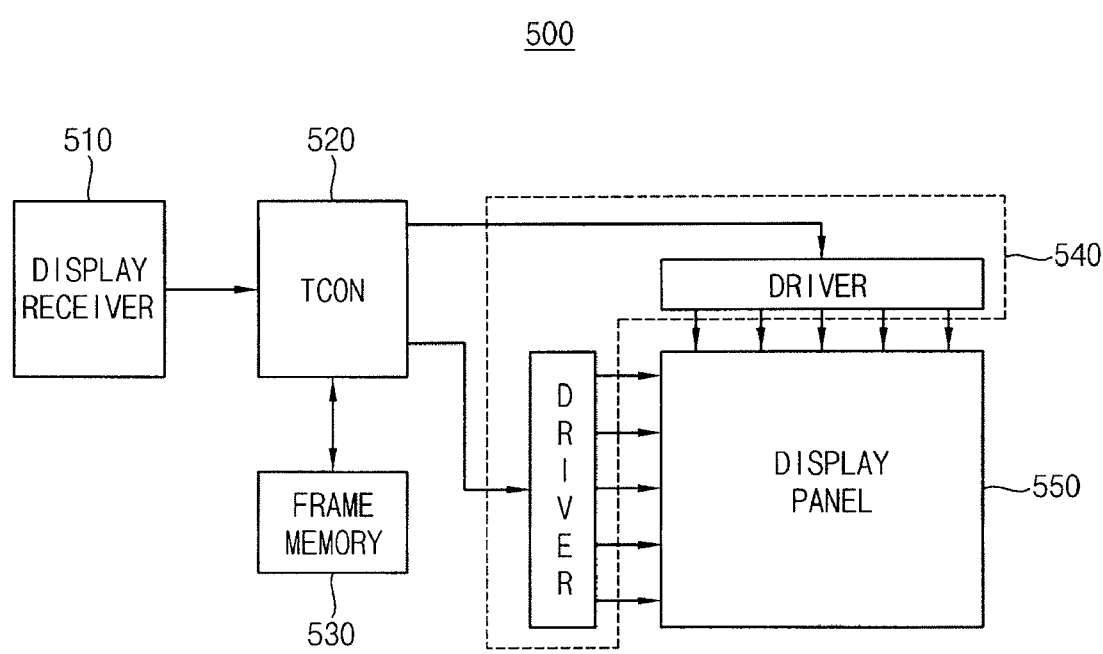
FIG. 6 is a block diagram illustrating a display device according to an exemplary embodiment.

FIG. 6 is a block diagram illustrating a display device according to an exemplary embodiment. The display device 500 includes a display receiver 510, a timing controller (TCON) 520, a frame memory 530, a panel driving unit 540 and a display panel 550.

The display receiver 510 receives frame data from the display transmitter 210 illustrated in FIG. 1. The frame data may include image data for an image to be displayed on the display panel 550 and/or a control pattern. When frame data for a moving image is received, the display receiver 510 receives and decodes the image data and the control pattern. When frame data for a still image is received, the display receiver 510 receives and decodes only the control pattern. Accordingly, power consumption of the display receiver 510 is reduced. If the control pattern includes sound data, the display receiver 510 provides the sound data to a sound output device (not shown), such as a speaker.

The display receiver 510 provides the decoded image data to the TCON 520. The display receiver 510 provides the decoded control pattern including image type information to the TCON 520. The TCON 520 stores the image data provided from the display receiver 510 in the frame memory 530. In an exemplary embodiment, the TCON 520 may include the frame memory 530 for storing the image data. In an exemplary embodiment, the TCON 520 may further include a line memory for storing image data for each line of a frame.

The TCON 520 provides the panel driving unit 540 with the image data provided from the display receiver 510. In an exemplary embodiment, the TCON 520 provides image control signals to the panel driving unit 540. For example, the image control signals may include a clock signal, a horizontal synchronization signal, a vertical synchronization signal, a data enable signal, a gamma voltage, and the like. When the TCON 520 receives the image type information indicating that the received frame data is for the still image from the display receiver 510, the TCON 520 provides the panel driving unit 540 with the image data stored in the frame memory 530.

The panel driving unit 540 outputs driving signals corresponding to the image data. The panel driving unit 540 may include a column driver and a row driver. For example, the panel driving unit 540 may include a source driver for providing the display panel 550 with a reference voltage corresponding to the image data in response to the image control signals, and a gate driver for performing on/off controls for thin film transistors (TFT) in the display panel 550 in response to the image control signals.

The display panel 550 displays an image corresponding to the image data in response to the output driving signals. In an exemplary embodiment, the display panel 550 may include a liquid crystal display (LCD) panel, an organic light emitting display (OLED panel, a plasma display panel (PDP), or the like.

FIG. 7 is a block diagram illustrating a display system according to an exemplary embodiment. The display system 600 includes a source device 700 and a display device 800.

The source device 700 includes a data source 710, a still image determiner 720 and a display transmitter 730. In an exemplary embodiment, the source device 700 may be a digital versatile disc (DVD) player, a computer, a set top box (STB), a video game console, a digital camcorder, a processor of a mobile phone, or the like. The data source 710 may generate image data and a control pattern for an image to be displayed by the display device 800. The control pattern may include image type information generated by the still image determiner 720. The still image determiner 720 determines whether frame data to be currently transmitted is for a still image. In an exemplary embodiment, when the frame data to be currently transmitted is for the still image, the still image determiner 720 counts the number of frame data for the still image to be sequentially transmitted. In an exemplary embodiment, the data source 710 includes the still image determiner 720. The display transmitter 730 encodes the image data and the control pattern, and transmits the encoded image data and the encoded control pattern to the display device 800. When the frame data for the still image is transmitted, the display transmitter 730 encodes and transmits only the control pattern to the display device 800.

The still image determiner 720 determines whether the frame data is for the still image or for a moving image by comparing the frame data to be currently transmitted with frame data previously transmitted. The data source 710 provides the display transmitter 730 with the image data and the control pattern or only the control pattern according to a determination result by the still image determiner 720. In the case where the frame data to be currently transmitted is the same as the frame data previously transmitted, the data source 710 provides only the control pattern to the display transmitter 730, and the display transmitter 730 encodes and transmits only the control pattern to the display device 800. Accordingly, when the frame data for the still image is transmitted, the source device 700, in particular the display transmitter 730, has low power consumption.

The display device 800 includes a display receiver 810, a TCON 820, a panel driving unit 830 and a display panel 840. In an exemplary embodiment, the display device 800 is a digital television (TV), a monitor, a display device of a mobile phone, or the like. The display receiver 810 receives and decodes the image data and the control pattern transmitted from the display transmitter 730. In an exemplary embodiment, the display device 800 may further include a sound output device (not shown). When the control pattern includes sound data, the display receiver 810 provides the sound data to the sound output device, such as a speaker. The display receiver 810 provides the image data or the image type information to the TCON 820. In an exemplary embodiment, the TCON 820 may include a frame memory (not shown) for storing the image data for a frame of the image. The TCON 820 provides the panel driving unit 830 with the image data provided from the display receiver 810 or with the image data stored in the frame memory. In an exemplary embodiment, the TCON 820 may apply image control signals to the panel driving unit 830. The panel driving unit 830 applies driving signals corresponding to the image data to the display panel 840, and thus the image corresponding to the image data is displayed on the display panel 840.

When the frame data for the still image is received, the display receiver 810 receives and decodes only the control pattern. In this case, the display receiver 810 provides the image type information to the TCON 820. The TCON 820 provides the image data stored in the frame memory to the panel driving unit 830. The panel driving unit 830 applies driving signals corresponding to the image data to the display panel 840, and thus the image corresponding to the image data stored in the frame memory is displayed on the display panel 840. Accordingly, when the frame data for the still image is received, the display device 800, in particular the display receiver 810, has low power consumption.

As described above, the display interface system, the display device and the display system according to exemplary embodiments reduces power consumption by transferring the control pattern having the image type information.

The display interface system, the display device and the display system according to the exemplary embodiments is applicable to a display system employing display interface techniques, such as a digital visual interface (DVI), a high definition multimedia interface (HDMI), a mobile industry processor interface (MIPI), a DisplayPort, or the like.

The foregoing is illustrative of exemplary embodiments of the present invention and is not to be construed as limiting thereof. Although practical exemplary embodiments have been described, those skilled in the art will readily appreciate that many modifications are possible in the exemplary embodiments without materially departing from the teachings of the present invention. Accordingly, all such modifications are intended to be included within the scope of the present invention as defined in the claims. Therefore, it is to be understood that the foregoing is merely illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A display interface system, comprising:
    a display transmitter configured to transmit a control pattern having image type information of a type of an image to be displayed and to selectively transmit image data corresponding to the type of the image to be displayed; and
    a display receiver configured to receive the control pattern and to selectively receive the image data based upon the image type information,
    wherein the display transmitter is configured to transmit the image data when the image to be displayed is a moving image and to not transmit the image data when the image to be displayed is a still image, and
    wherein the display receiver is configured to receive the image data when the image to be displayed is the moving image, and to not receive the image data when the image to be displayed is the still image.

2. The display interface system of claim 1, wherein the image type information comprises a still image bit that indicates whether the image to be displayed is a still image or a moving image.

3. The display interface system of claim 2, wherein the image type information further comprises a still image count that represents a number of frames of the still image to be sequentially displayed.

4. A display interface system, comprising:
    a display transmitter configured to transmit a control pattern having image type information of a type of an image to be displayed and to selectively transmit image data corresponding to the type of the image to be displayed; and
    a display receiver configured to receive the control pattern and to selectively receive the image data based upon the image type information,
    wherein the display transmitter comprises:
        a first link layer unit configured to encode the control pattern and to selectively encode the image data; and
        a first physical layer unit configured to transmit the control pattern and to selectively transmit the image data, and
    wherein the display receiver comprises:
        a second physical layer unit configured to receive the control pattern and to selectively receive the image data; and
        a second link layer unit configured to decode the control pattern and to selectively decode the image data.

5. The display interface system of claim 4, wherein the first link layer unit is configured to encode the image data when the image to be displayed is a moving image and to not encode the image data when the image to be displayed is a still image,
    wherein the first physical layer unit is configured to transmit the image data when the image to be displayed is the moving image and to not transmit the image data when the image to be displayed is the still image,
    wherein the second physical layer unit is configured to receive the image data when the image to be displayed is the moving image and to not receive the image data when the image to be displayed is the still image, and
    wherein the second link layer unit decodes the image data when the image to be displayed is the moving image, and does not decode the image data when the image to be displayed is the still image.

6. The display interface system of claim 4, wherein the display transmitter further comprises a first power supply unit that provides first power to the first link layer unit and the first physical layer unit,
    wherein the display receiver further comprises a second power supply unit that provides second power to the second physical layer and the second link layer unit,
    wherein the first power supply unit is configured to provide the first power to only a portion of the first link layer unit and to only a portion of the first physical layer unit when the image to be displayed is a still image, and
    wherein the second power supply unit is configured to provide the second power to only a portion of the second physical layer and to only a portion of the second link layer unit when the image to be displayed is the still image.

7. The display interface system of claim 6, wherein the first link layer unit comprises a control pattern encoder that encodes the control pattern and an image data encoder that encodes the image data,
    wherein the first physical layer unit comprises a control pattern transmitting unit that transmits the control pattern and an image data transmitting unit that transmits the image data,
    wherein the second physical layer unit comprises a control pattern receiving unit that receives the control pattern and an image data receiving unit that receives the image data,
    wherein the second link layer unit comprises a control pattern decoder that decodes the control pattern and an image data decoder that decodes the image data,
    wherein the first power supply unit is configured to provide the first power to the control pattern encoder and the control pattern transmitting unit and to not provide the first power to the image data encoder and the image data transmitting unit when the image to be displayed is the still image, and
    wherein the second power supply unit is configured to provide the second power to the control pattern receiving unit and the control pattern decoder and to not provide the second power to the image data receiving unit and the image data decoder when the image to be displayed is the still image.

8. A display device, comprising:
a display receiver configured to receive a control pattern having image type information about a type of an image to be displayed and to selectively receive image data based upon the image type information;
a timing controller configured to receive the image data from the display receiver and to store the image data
a panel driving unit configured to receive the image data from the timing controller and to generate driving signals corresponding to the image data and
a display panel configured to receive the driving signals from the panel driving unit and to display the image corresponding to the image data,
wherein the display receiver is configured to receive the image data when the image to be displayed is a moving image, and to not receive the image data when the image to be displayed is a still image.

9. The display device of claim 8, wherein the image type information comprises a still image bit that indicates whether the image to be displayed is a still image or a moving image.

10. The display device of claim 9, wherein the image type information further comprises a still image count that represents a number of frames of the still image to be sequentially displayed.

11. A display device, comprising:
a display receiver configured to receive a control pattern having image type information about a type of an image to be displayed and to selectively receive image data based upon the image type information;
a timing controller configured to receive the image data from the display receiver and to store the image data;
a panel driving unit configured to receive the image data from the timing controller and to generate driving signals corresponding to the image data; and
a display panel configured to receive the driving signals from the panel driving unit and
wherein the display receiver comprises:
a physical layer unit configured to receive the control pattern and to selectively receive the image data; and
a link layer unit configured to decode the control pattern and to selectively decode the image data.

12. The display device of claim 11, wherein the physical layer unit is configured to receive the image data when the image to be displayed is a moving image and to not receive the image data when the image to be displayed is a still image, and
wherein the link layer unit is configured to decode the image data when the image to be displayed is the moving image and to not decode the image data when the image to be displayed is the still image.

13. The display device of claim 11, wherein the display receiver further comprises a power supply unit that provides power to the physical layer and to the link layer unit, and
wherein the power supply unit is configured to provide the power to only a portion of the physical layer and to only a portion of the link layer unit when the image to be displayed is the still image.

14. A display device, comprising:
a display receiver configured to receive a control pattern having image type information about a type of an image to be displayed and to selectively receive image data based upon the image type information;
a timing controller configured to receive the image data from the display receiver and to store the image data
a panel driving unit configured to receive the image data from the timing controller and to generate driving signals corresponding to the image data; and
a display panel configured to receive the driving signals from the panel driving unit and to display the image corresponding to the image data,
wherein the timing controller comprises a frame memory that stores the image data,
wherein the timing controller is configured to control the frame memory to store the image data when the image data to be displayed is a moving image, and
wherein the timing controller is configured to provide the image data stored in the frame memory to the panel driving unit when the image data to be displayed is a still image.

* * * * *